US010556592B2

United States Patent
Ienaga et al.

(10) Patent No.: US 10,556,592 B2
(45) Date of Patent: Feb. 11, 2020

(54) VEHICLE CONTROL DEVICE

(71) Applicant: SUBARU CORPORATION, Tokyo (JP)

(72) Inventors: Hiroshi Ienaga, Tokyo (JP); Shinichi Sakaguchi, Tokyo (JP); Takahiro Kobayashi, Tokyo (JP); Takeshi Yoneda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 132 days.

(21) Appl. No.: 15/856,719

(22) Filed: Dec. 28, 2017

(65) Prior Publication Data
US 2018/0265091 A1 Sep. 20, 2018

(30) Foreign Application Priority Data

Mar. 16, 2017 (JP) ................................ 2017-051362

(51) Int. Cl.
*B60W 30/18* (2012.01)
*B60W 10/119* (2012.01)

(52) U.S. Cl.
CPC .... *B60W 30/18172* (2013.01); *B60W 10/119* (2013.01); *B60W 2520/26* (2013.01); *B60W 2520/28* (2013.01)

(58) Field of Classification Search
CPC ......... B60W 30/18172; B60W 10/119; B60W 2520/26; B60W 2520/28; Y02T 10/7275
(Continued)

(56) References Cited

U.S. PATENT DOCUMENTS 4,936,406 A * 6/1990 Tezuka ............... B60K 23/0808
180/249
5,002,147 A * 3/1991 Tezuka ............... B60K 23/0808
180/197
(Continued)

FOREIGN PATENT DOCUMENTS

CN 106444569 A * 2/2017
EP 0898098 A2 * 2/1999 ........... B60K 28/165
(Continued)

OTHER PUBLICATIONS

Japanese Office Action, dated Aug. 28, 2018, in Japanese Application No. 2017-051362 and English Translation thereof.
(Continued)

*Primary Examiner* — Tuan C To
(74) *Attorney, Agent, or Firm* — McGinn I.P. Law Group, PLLC.

(57) ABSTRACT

A vehicle control device includes a slippage determination unit, a control unit, a different-diameter determination unit and a threshold adjuster. The slippage determination unit determines that a drive wheel is slipping when an index value that is correlated with a rotation speed of the drive wheel exceeds a threshold. The control unit controls a driving force of the drive wheel such that the index value matches a target value when it is determined that the drive wheel is slipping. The different-diameter determination unit determines whether a different-diameter tire that has a different diameter from a reference diameter is mounted on the drive wheel. The threshold adjuster adjusts a threshold on the basis of a ratio between a diameter of the tire mounted on the drive wheel and the reference diameter when it is determined that the different-diameter tire is mounted on the drive wheel.

15 Claims, 8 Drawing Sheets

(58) Field of Classification Search
USPC .......................................................... 701/82
See application file for complete search history.

(56) References Cited

U.S. PATENT DOCUMENTS

| | | | | |
|---|---|---|---|---|
| 5,067,778 | A * | 11/1991 | Testardi | B60T 8/00 303/113.1 |
| 5,362,139 | A * | 11/1994 | Watanabe | B60T 8/1755 303/186 |
| 5,498,072 | A * | 3/1996 | Shimizu | B60T 8/175 303/191 |
| 7,837,202 | B2 * | 11/2010 | Taneda | B60G 17/0162 280/124.106 |
| 8,688,314 | B2 * | 4/2014 | Duan | G01M 17/013 700/28 |
| 9,574,876 | B2 * | 2/2017 | Suzuki | G01C 1/00 |
| 2001/0025219 | A1 * | 9/2001 | Ohba | B60K 6/365 701/89 |
| 2005/0177295 | A1 | 8/2005 | Rodrigues et al. | |
| 2008/0147273 | A1 * | 6/2008 | Bauer | B60T 8/175 701/41 |
| 2009/0091093 | A1 * | 4/2009 | Urababa | B60G 17/0162 280/5.511 |
| 2009/0210128 | A1 * | 8/2009 | Fujimoto | B60L 3/10 701/84 |
| 2010/0238007 | A1 * | 9/2010 | Kikuchi | B60C 23/04 340/438 |
| 2010/0312448 | A1 * | 12/2010 | Kueperkoch | B60T 8/172 701/82 |
| 2011/0246020 | A1 * | 10/2011 | Munnix | B60W 40/10 701/29.2 |
| 2012/0104834 | A1 * | 5/2012 | Sgherri | B60B 15/14 301/46 |
| 2015/0360693 | A1 * | 12/2015 | Ienaga | B60K 28/16 701/90 |
| 2016/0089982 | A1 * | 3/2016 | Ienaga | B60L 3/102 701/22 |
| 2016/0090004 | A1 * | 3/2016 | Ienaga | B60L 15/2036 701/22 |

FOREIGN PATENT DOCUMENTS

| | | |
|---|---|---|
| JP | H 08-156767 A | 6/1996 |
| JP | 2004-090703 A | 3/2004 |
| JP | 2007-261477 A | 10/2007 |
| JP | 2007-314099 A | 12/2007 |
| JP | 2015-000589 A | 1/2015 |
| JP | 2016-111834 A | 6/2016 |
| KR | 20070062138 A * | 6/2007 |

OTHER PUBLICATIONS

JPO Decision of Grant in JPA No. 2017-051362, dated Feb. 26, 2019, and English translation.

* cited by examiner

VEHICLE CONTROL DEVICE

CROSS-REFERENCE TO RELATED APPLICATIONS

The present application claims priority from Japanese Patent Application No. 2017-051362 filed on Mar. 16, 2017, the entire contents of which are hereby incorporated by reference.

BACKGROUND

1. Technical Field

The present invention relates to a vehicle control device.

2. Related Art

Conventionally, a technique of separately controlling a driving force of a front wheel and a driving force of a rear wheel in a vehicle has been known. More specifically, the vehicle includes a drive source that drives the front wheel and a drive source that drives the rear wheel, and controls output of each of the drive sources. In this way, the driving force of the front wheel and the driving force of the rear wheel can separately be controlled.

For instance, Japanese Unexamined Patent Application Publication (JP-A) No. 2007-314099 (Patent Literature 1) discloses a technique of separately controlling driving forces of front wheels and driving forces of rear wheels in a four-wheel drive vehicle in which at least one of an engine or a front motor serves as a drive source of a left front wheel and a right front wheel and in which a rear motor serves as a drive source of a left rear wheel and a right rear wheel.

In a technical field of separated control of the driving force of the front wheel and the driving force of the rear wheel, there is a case where it is determined whether a drive wheel is slipping and driving force control is executed on the basis of a determination result. For instance, in the case where it is determined that the drive wheel is slipping, slippage control is possibly executed. In the slippage control, a driving force of the drive wheel is controlled such that a rotation speed of the drive wheel matches a target rotation speed. More specifically, in the slippage control, torque down is executed. The torque down is control of lowering drive torque of the drive wheel, which is determined to be slipping. When the slippage control is executed, just as described, a difference between the rotation speed of the front wheel and the rotation speed of the rear wheel can be reduced. More specifically, when the slippage control is executed, a slipping state of the drive wheel is canceled. In this way, the difference between the rotation speed of the front wheel and the rotation speed of the rear wheel can be reduced. Thus, vehicle behavior can be stabilized. In regard to the above determination on the slippage, it is determined that the drive wheel is slipping in the case where the rotation speed of the drive wheel exceeds a threshold, for instance.

A tire has a reference diameter that corresponds to the vehicle, and such a tire is basically mounted on the drive wheel of the vehicle. However, the following situation possibly occurs: a different-diameter tire has a different diameter from the reference diameter, and such a different-diameter tire is mounted on the drive wheel. For instance, as such a situation, a situation where a spare tire is mounted on the drive wheel, a situation where the tire mounted on the drive wheel has been punctured, and the like are assumed. In any of these situations, the diameter of the different-diameter tire is smaller than the reference diameter. Thus, even in the case where the drive wheel on which the different-diameter tire is mounted does not actually slip, the rotation speed of the drive wheel possibly exceeds the threshold, which is used for the above determination on the slippage. As a result, even when the slippage does not actually occur, the slippage control is executed, which possibly leads to the execution of the torque down at an excessive frequency. Just as described, in the situation where the different-diameter tire is mounted on the drive wheel, the vehicle behavior possibly becomes unstable when the driving force control that corresponds to the actual slipping state is not executed.

SUMMARY OF THE INVENTION

It is desirable to provide a novel and improved vehicle control device capable of preventing vehicle behavior from becoming unstable in a situation where a different-diameter tire is mounted on a drive wheel.

An aspect of the present invention provided a vehicle control device that includes: a slippage determination unit configured to determine that a drive wheel is slipping in the case where an index value that is correlated with a rotation speed of the drive wheel exceeds a threshold; a control unit configured to control a driving force of the drive wheel such that the index value matches a target value in the case where it is determined that the drive wheel is slipping; a different-diameter determination unit configured to determine whether a different-diameter tire that has a different diameter from a reference diameter is mounted on the drive wheel; and a threshold adjuster configured to adjust the threshold on the basis of a ratio between a diameter of the tire, which is mounted for the drive wheel, and the reference diameter in the case where it is determined that the different-diameter tire is mounted on the drive wheel.

DETAILED DESCRIPTION

A detailed description will hereinafter be made on a preferred example of the present invention with reference to the accompanying drawings. In the specification and the drawings, components that have substantially the same functional configurations will be denoted by the same reference signs, and overlapping descriptions thereon will not be made.

1. Summary of Vehicle

Figure 1:
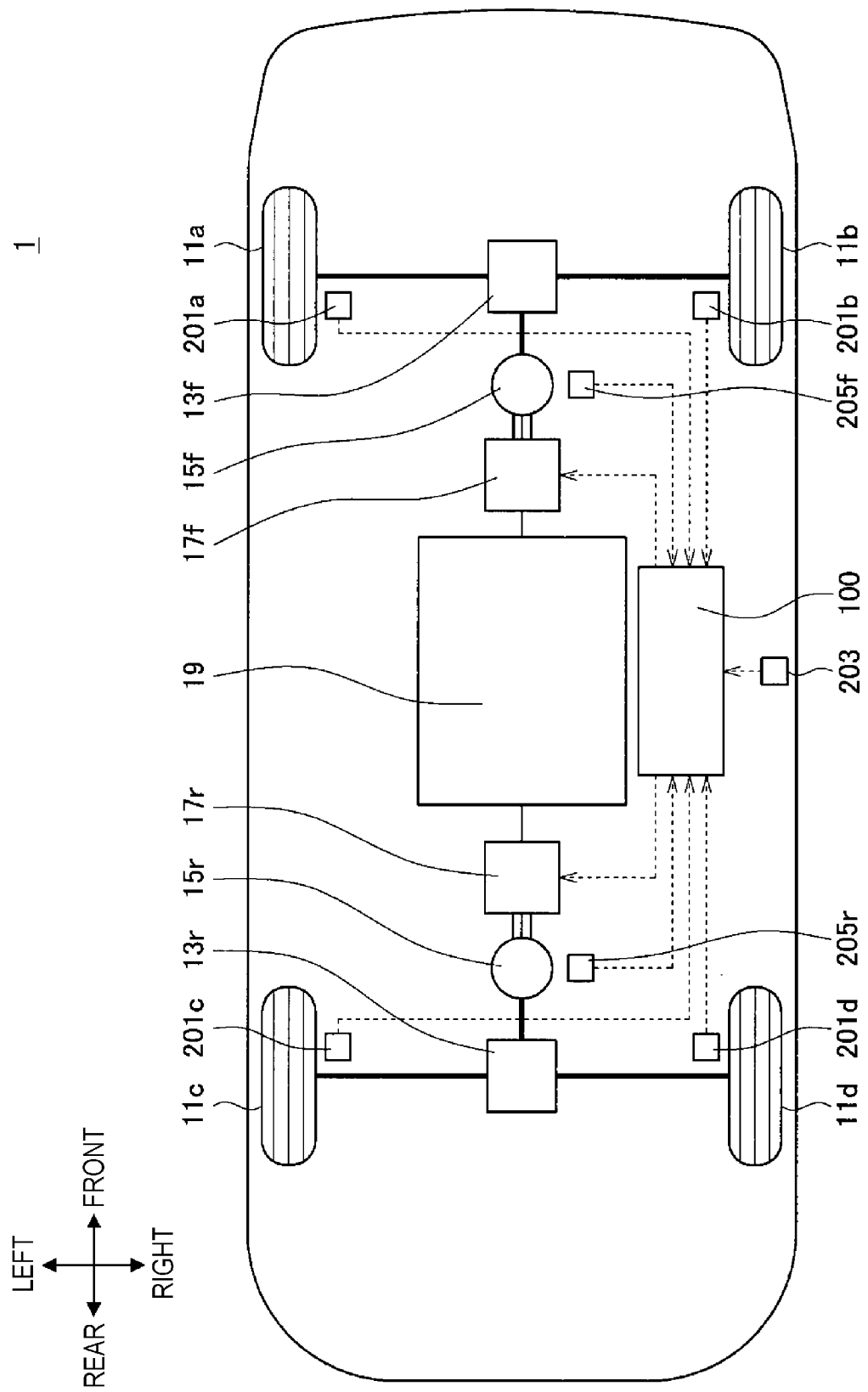
FIG. 1 is a schematic view illustrating an instance of a schematic configuration of a drive system of a vehicle according to an example of the present invention.

First, summary of a vehicle 1 according to an example of the present invention will be described with reference to FIG. 1. FIG. 1 is a schematic view illustrating an instance of a schematic configuration of a drive system of the vehicle 1 according to the example.

The vehicle 1 is an instance of a vehicle that includes a control device according to the example. More specifically, as illustrated in FIG. 1, the vehicle 1 includes: a drive motor 15$f$ as a drive source that drives a left front wheel 11$a$ and a right front wheel 11$b$; and a drive motor 15$r$ as a drive source that drives a left rear wheel 11$c$ and a right rear wheel 11$d$. The vehicle 1 also includes a control device 100 that controls the drive motor 15$f$ and the drive motor 15$r$. Here, FIG. 1 illustrates the vehicle 1 in a manner that an advancing direction of the vehicle 1 is set as a front direction, a reverse direction of the advancing direction is set as a rear direction, and left and right sides of the vehicle 1 in a state of facing the advancing direction are respectively set as a left direction and a right direction.

The drive motor 15$f$ is a motor that drives the left front wheel 11$a$ and the right front wheel 11$b$ as drive wheels. More specifically, the drive motor 15$f$ can output power used to drive the left front wheel 11$a$ and the right front wheel 11$b$ by using electric power that is supplied from a battery 19. The power output from the drive motor 15$f$ is transmitted to a front differential device 13$f$. The front differential device 13$f$ is coupled to each of the left front wheel 11$a$ and the right front wheel 11$b$ via a driveshaft. The power output from the drive motor 15$f$ is split and transmitted to the left front wheel 11$a$ and the right front wheel 11$b$ by the front differential device 13$f$. The drive motor 15$f$ may be coupled to the front differential device 13$f$ via a decelerator, which is not illustrated.

The drive motor 15$f$ is a polyphase AC motor, for instance, and is electrically coupled to the battery 19 via an inverter 17$f$. DC power supplied from the battery 19 is converted to AC power by the inverter 17$f$, and the AC power is then supplied to the drive motor 15$f$. The drive motor 15$f$ thereby generates the power. The drive motor 15$f$ may also have a function as a generator that generates the electric power by using kinetic energy of the vehicle 1 during deceleration of the vehicle 1. In the case where the drive motor 15$f$ functions as the generator, the drive motor 15$f$ uses rotational energy of the left front wheel 11$a$ and the right front wheel 11$b$ to generate the AC power. The AC power is then converted to the DC power by the inverter 17$f$, and the DC power is stored in the battery 19. In this way, rotation of each of the left front wheel 11$a$ and the right front wheel 11$b$ is resisted, and a braking force is generated.

The drive motor 15$r$ is a motor that drives the left rear wheel 11$c$ and the right rear wheel 11$d$ as the drive wheels. More specifically, the drive motor 15$r$ can output power used to drive the left rear wheel 11$c$ and the right rear wheel 11$d$ by using the electric power that is supplied from the battery 19. The power output from the drive motor 15$r$ is transmitted to a rear differential device 13$r$. The rear differential device 13$r$ is coupled to each of the left rear wheel 11$c$ and the right rear wheel 11$d$ via a driveshaft. The power output from the drive motor 15$r$ is split and transmitted to the left rear wheel 11$c$ and the right rear wheel 11$d$ by the rear differential device 13$r$. The drive motor 15$r$ may be coupled to the rear differential device 13$r$ via a decelerator, which is not illustrated.

The drive motor 15$r$ is the polyphase AC motor, for instance, and is electrically coupled to the battery 19 via an inverter 17$r$. The DC power supplied from the battery 19 is converted to the AC power by the inverter 17$r$, and the AC power is then supplied to the drive motor 15$r$. The drive motor 15$r$ thereby generates the power. The drive motor 15$r$ may also have a function as the generator that generates the electric power by using the kinetic energy of the vehicle 1 during the deceleration of the vehicle 1. In the case where the drive motor 15$r$ functions as the generator, the drive motor 15$r$ uses the rotational energy of the left rear wheel 11$c$ and the right rear wheel 11$d$ to generate the AC power. The AC power is then converted to the DC power by the inverter 17$r$, and the DC power is stored in the battery 19. In this way, rotation of each of the left rear wheel 11$c$ and the right rear wheel 11$d$ is resisted, and the braking force is generated.

The vehicle 1 includes various sensors. For instance, as illustrated in FIG. 1, the vehicle 1 includes drive wheel rotation speed sensors 201$a$, 201$b$, 201$c$, 201$d$, a vehicle speed sensor 203, and motor rotation speed sensors 205$f$, 205$r$.

The drive wheel rotation speed sensors 201$a$, 201$b$, 201$c$, 201$d$ each detect a rotation speed of the corresponding drive wheel and output a detection result. More specifically, the drive wheel rotation speed sensors 201$a$, 201$b$, 201$c$, 201$d$ respectively detect the rotation speeds of the left front wheel 11$a$, the right front wheel 11$b$, the left rear wheel 11$c$, and the right rear wheel 11$d$.

The vehicle speed sensor 203 detects a vehicle speed as a speed of the vehicle 1 and outputs a detection result. More specifically, the vehicle speed sensor 203 detects a speed of a vehicle body as the vehicle speed.

The motor rotation speed sensors 205$f$, 205$r$ each detect a rotation speed of the corresponding drive motor and output a detection result. More specifically, the motor rotation speed sensors 205$f$, 205$r$ respectively detect the rotation speeds of the drive motor 15$f$ and the drive motor 15$r$.

The control device 100 is configured by including: a central processing unit (CPU) as an arithmetic processing unit; read only memory (ROM) as a storage element that stores programs, operation parameters, and the like used by the CPU; random access memory (RAM) as a storage element that temporarily stores parameters and the like, the parameters being appropriately changed during an operation of the CPU; and the like.

The control device 100 controls an operation of each of the devices that constitute the vehicle 1. For instance, the control device 100 controls the operation of each of the devices by outputting an operation instruction using an electric signal to each of the devices as a control target. More specifically, by controlling the operation of the inverter 17$f$, the control device 100 controls driving of and power generation by the drive motor 15$f$. In addition, by controlling the operation of the inverter 17$r$, the control device 100 controls driving of and power generation by the drive motor 15$r$. In this way, the control device 100 can control the output of each of the drive motor 15f and the drive motor 15r. Accordingly, the control device 100 can separately control the driving forces of the front wheels and the driving forces of the rear wheels. Thus, the control device 100 can separately control the rotation speeds of the front wheels and the rotation speeds of the rear wheels.

The control device 100 receives information output from each of the devices. The control device 100 communicates with each of the devices through a controller area network (CAN) communication, for instance. For instance, the control device 100 receives the various detection results that are output from the drive wheel rotation speed sensors 201a, 201b, 201c, 201d, the vehicle speed sensor 203, and the motor rotation speed sensors 205f, 205r. The functions of the control device 100 according to the example may be divided by a plurality of control devices, in which case the plurality of control devices may be coupled to each other via a communication bus such as the CAN.

The control device 100 determines whether any of the drive wheels is slipping. More specifically, in the case where an index value that is correlated with the rotation speed of the drive wheel exceeds a threshold, the control device 100 determines that the drive wheel is slipping. The index value is the rotation speed of the drive wheel, for instance. Based on the detection result of slippage, the control device 100 executes driving force control. More specifically, when determining that the drive wheel is slipping, the control device 100 executes slippage control. In the slippage control, the driving force of the drive wheel is controlled such that the index value for the drive value matches a target value. For instance, when determining that the drive wheel is slipping, the control device 100 executes the slippage control, in which the driving force of the drive wheel is controlled, such that the rotation speed of the drive wheel as the index value matches a target rotation speed as the target value. More specifically, in the slippage control, the control device 100 executes torque down of the drive wheel, which is determined to be slipping, such that the rotation speed of the drive wheel matches the target rotation speed. When the slippage control is executed, just as described, a difference between the rotation speed of each of the front wheels and the rotation speed of each of the rear wheels can be reduced. Thus, vehicle behavior can be stabilized.

In addition, the control device 100 according to the example determines whether a different-diameter tire that has a different diameter from a reference diameter is mounted on the drive wheel. Based on a determination result of the different-diameter tire, the control device 100 adjusts the threshold that is used for the above determination on the slippage. The control device 100 according to the example adjusts the threshold on the basis of the determination result regarding the different-diameter tire. Thus, in a situation where the different-diameter tire is mounted on the drive wheel, the vehicle behavior can be prevented from becoming unstable. Details of such a control device 100 will be described in the next section.

2. Control Device

Next, the control device 100 according to the example will be described in detail with reference to FIG. 2 to FIG. 7.

[2-1. Functional Configuration]

Figure 2:
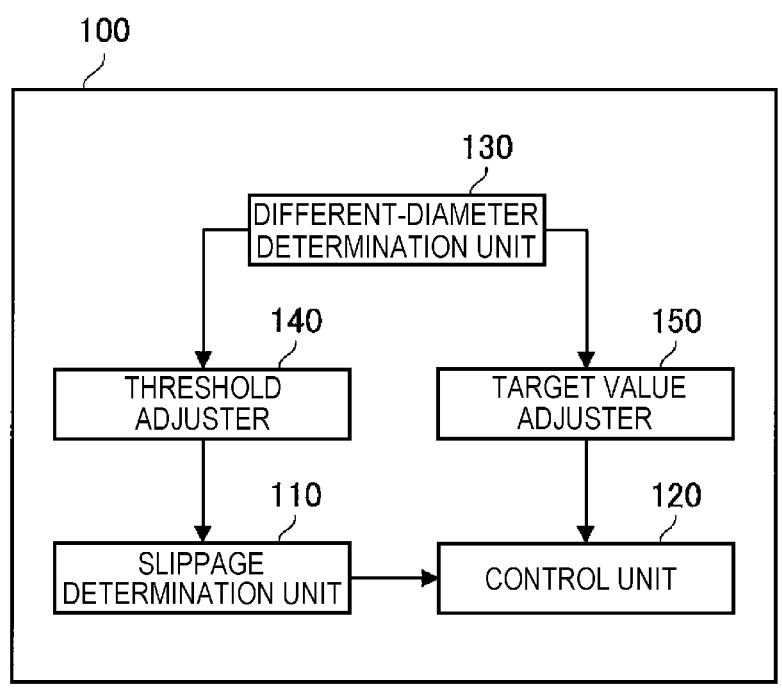
FIG. 2 is a block diagram illustrating an example of a functional configuration of a control device according to the example.

First, a functional configuration of the control device 100 according to the example will be described with reference to FIG. 2 to FIG. 6. FIG. 2 is a block diagram illustrating an example of the functional configuration of the control device 100 according to the example.

For instance, as illustrated in FIG. 2, the control device 100 includes a slippage determination unit 110, a control unit 120, a different-diameter determination unit 130, a threshold adjuster 140, a target value adjuster 150.

(Slippage Determination Unit)

The slippage determination unit 110 determines whether the drive wheel is slipping. In addition, the slippage determination unit 110 outputs a determination result to the control unit 120. More specifically, in the case where the index value, which is correlated with the rotation speed of the drive wheel, exceeds the threshold, the slippage determination unit 110 determines that the drive wheel is slipping. The threshold is a value that is set to determine whether the drive wheel is slipping. Because the threshold possibly differs in accordance with the vehicle speed as will be described below, the slippage determination unit 110 uses the threshold, which corresponds to the vehicle speed, to determine whether the drive wheel is slipping.

The index value is the rotation speed of the drive wheel, for instance. In such a case, in the case where the rotation speed of the drive wheel exceeds the threshold, the slippage determination unit 110 determines that the drive wheel is slipping. More specifically, the slippage determination unit 110 determines whether each of the drive wheels is slipping. For instance, in the case where the rotation speed of the left front wheel 11a exceeds the threshold, the slippage determination unit 110 determines that the left front wheel 11a is slipping. As will be described below, the index value may be the rotation speed of the motor that drives the drive wheels. However, a description will hereinafter be made primarily on an instance in which the rotation speed of the drive wheel is applied as the index value.

In the example, the different-diameter determination unit 130, which will be described below, determines whether the different-diameter tire is mounted on the drive wheel. In the case where it is determined that the different-diameter tire is mounted on the drive wheel, the threshold is adjusted by the threshold adjuster 140, which will be described below. More specifically, the threshold is set for each of the drive wheels. Accordingly, in the case where it is determined that the different-diameter tire is mounted on the drive wheel, only the threshold of the drive wheel is adjusted, and the threshold of the drive wheel on which the different-diameter tire is not determined to be mounted is not adjusted. For instance, in the case where it is determined that the different-diameter tire is mounted on the left front wheel 11a, the threshold of the left front wheel 11a is adjusted. Meanwhile, in the case where it is not determined that the different-diameter tire is mounted on each of the right front wheel 11b, the left rear wheel 11c, and the right rear wheel 11d, the thresholds of the right front wheel 11b, the left rear wheel 11c, and the right rear wheel 11d are not adjusted. Details of adjustment of the threshold executed by the threshold adjuster 140 will be described below.

The threshold of the drive wheel on which the different-diameter tire is not determined to be mounted is set to a reference threshold Nth. The reference threshold Nth is the threshold in the case where it is not determined that the different-diameter tire is mounted on the drive wheel, and is stored in advance in the storage element of the control device 100, for instance. The case where it is not determined that the different-diameter tire is mounted on the drive wheel corresponds to a case where a normal tire that has the reference diameter is mounted on the drive wheel. The reference diameter is set in advance in accordance with various design specifications of the vehicle 1. Accordingly, more specifically, in the case where the normal tire is mounted on the drive wheel, the reference threshold Nth is set to a value with which it can be determined whether the drive wheel is slipping. For instance, the reference threshold Nth is set in accordance with the reference diameter, which is a diameter of the normal tire. Because the reference diameter of each of the drive wheels in the vehicle 1 is basically the same, the reference threshold Nth of each of the drive wheels can be set to the same value.

Figure 3:
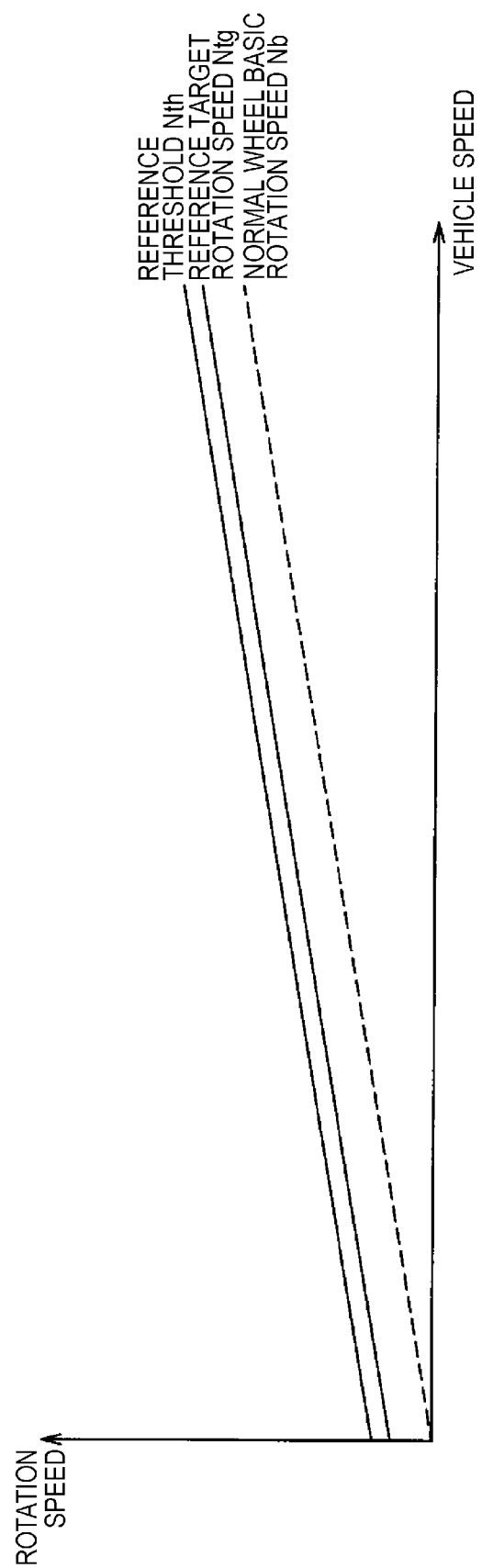
FIG. 3 is an explanatory graph illustrating an instance of a relationship between a reference threshold and a vehicle speed and an instance of a relationship between a reference target rotation speed and the vehicle speed.

With reference to FIG. 3, the reference threshold Nth will be described in more detail. FIG. 3 is an explanatory graph illustrating an instance of a relationship between the reference threshold Nth and the vehicle speed and an instance of a relationship between a reference target rotation speed Ntg and the vehicle speed. The reference target rotation speed Ntg will be described below in the description of the control unit 120.

In the case where the drive wheel is slipping, the rotation speed of the drive wheel is higher than a basic rotation speed that is the rotation speed of the drive wheel in the case where the drive wheel is not slipping. Accordingly, in the case where the drive wheel on which the normal tire is mounted is slipping, the rotation speed of the drive wheel is higher than a normal wheel basic rotation speed Nb that is the basic rotation speed in the case where the drive wheel on which the normal tire is mounted is not slipping. Thus, as illustrated in FIG. 3, the reference threshold Nth is set to be a higher value than the normal wheel basic rotation speed Nb. For instance, as illustrated in FIG. 3, the reference threshold Nth may be set as the higher value than the normal wheel basic rotation speed Nb by a constant magnitude at each vehicle speed. The reference threshold Nth may also be set as a higher value than the reference target rotation speed Ntg, which will be described below, by a constant magnitude at each vehicle speed. Here, the normal wheel basic rotation speed Nb is increased as the vehicle speed is increased. Thus, as specifically illustrated in FIG. 3, the reference threshold Nth is set to be increased as the vehicle speed is increased.

(Control Unit)

The control unit 120 separately controls the driving forces of the front wheels and the driving forces of the rear wheels. More specifically, the control unit 120 outputs the operation instruction to each of the inverter 17*f* and the inverter 17*r*, and thereby controls the output of each of the drive motor 15*f* and the drive motor 15*r*. In this way, the driving forces of the front wheels and the driving forces of the rear wheels are separately controlled. More specifically, based on the detection result of the slippage by the slippage determination unit 110, the control unit 120 executes the driving force control.

In the case where it is determined that none of the drive wheels is slipping, the control unit 120 executes normal control. The normal control is the driving force control that is based on requested torque as a requested value of drive torque used to run the vehicle 1. More specifically, in the normal control, the control unit 120 computes the requested torque on the basis of an accelerator opening degree, and allocates the computed requested torque to the front wheels and the rear wheels. Then, the control unit 120 executes the driving force control such that the drive torque of the front wheels and the drive torque of the rear wheels each correspond to the allocated torque. A ratio of the allocation of the requested torque to the front wheels and the rear wheels can appropriately beset. Alternatively, the requested torque may be computed by another control device that differs from the control device 100. In such a case, the control device 100 receives information that indicates the requested torque and is output from the other control device.

Meanwhile, in the case where it is determined that the drive wheel is slipping, the control unit 120 executes the slippage control, in which the driving force of the drive wheel is controlled such that the index value matches the target value. The target value is a value that is set to stabilize the vehicle behavior by reducing the difference between the rotation speed of each of the front wheels and the rotation speed of each of the rear wheels. More specifically, the target value is a value that is set to cancel a slipping state of the drive wheel. Because the target value possibly differs in accordance with the vehicle speed as will be described below, the control unit 120 executes the slippage control by using the target value, which corresponds to the vehicle speed. In the case where the rotation speed of the drive wheel is applied as the index value, the target rotation speed is applied as the target value, for instance. Accordingly, in the case where it is determined that the drive wheel is slipping, the control unit 120 controls the driving force of the drive wheel such that the rotation speed of the drive wheel as the index value matches the target rotation speed as the target value. For instance, in the case where it is determined that the left front wheel 11*a* is slipping, the control unit 120 controls the driving force of the left front wheel 11*a* such that the rotation speed of the left front wheel 11*a* matches the target rotation speed.

More specifically, in the slippage control, the control unit 120 executes the torque down of the drive wheel that is determined to be slipping, and thereby controls the drive torque of the drive wheel such that the rotation speed of the drive wheel matches the target rotation speed. For instance, in the case where it is determined that the left front wheel 11*a* is slipping, the control unit 120 lowers the output of the drive motor 15*f*, which drives the front wheels, so as to lower the drive torque of the left front wheel 11*a*. As a result, the drive torque of the left front wheel 11*a* during the slippage control becomes lower than that during the normal control. By executing the torque down of the left front wheel 11*a*, just as described, the control unit 120 controls the drive torque of the left front wheel 11*a* such that the rotation speed of the left front wheel 11*a* matches the target rotation speed.

In the case where it is determined that the different-diameter tire is mounted on the drive wheel, the target rotation speed as the target value is adjusted by the target value adjuster 150, which will be described below. More specifically, the target rotation speed as the target value is set for each of the drive wheels. Accordingly, in the case where it is determined that the different-diameter tire is mounted on the drive wheel, only the target rotation speed of the drive wheel is adjusted, and the target rotation speed of the drive wheel on which the different-diameter tire is not determined to be mounted is not adjusted. For instance, in the case where it is determined that the different-diameter tire is mounted on the left front wheel 11*a*, the target rotation speed of the left front wheel 11*a* is adjusted. Meanwhile, in the case where it is not determined that the different-diameter tire is mounted on each of the right front wheel 11*b*, the left rear wheel 11*c*, and the right rear wheel 11*d*, the target rotation speeds of the right front wheel 11*b*, the left rear wheel 11*c*, and the right rear wheel 11*d* are not adjusted. Details of adjustment of the target value executed by the target value adjuster 150 will be described below.

The target rotation speed of the drive wheel on which the different-diameter tire is not determined to be mounted is set to the reference target rotation speed Ntg. The reference target rotation speed Ntg is the target rotation speed in the case where it is not determined that the different-diameter tire is mounted on the drive wheel, and is stored in advance in the storage element of the control device 100, for instance. As described above, the case where it is not determined that the different-diameter tire is mounted on the drive wheel corresponds to the case where the normal tire is mounted on the drive wheel. Accordingly, more specifically, in the case where the normal tire is mounted on the drive wheel, the reference target rotation speed Ntg is set to a value at which the vehicle behavior can be stabilized by lowering the rotation speed of the drive wheel, the slippage of which has occurred, and thereby reducing the difference between the rotation speed of each of the front wheels and the rotation speed of each of the rear wheels. More specifically, the reference target rotation speed Ntg is set to a value at which the slipping state of the drive wheel on which the normal tire is mounted can be canceled. For instance, the reference target rotation speed Ntg is set in accordance with the reference diameter, which is the diameter of the normal tire. Because the reference diameter of each of the drive wheels in the vehicle 1 is basically the same as described above, the reference target rotation speed Ntg of each of the drive wheels can be set to the same value.

The reference target rotation speed Ntg will be described in more detail with reference to FIG. 3.

In the case where the rotation speed of the drive wheel on which the normal tire is mounted exceeds the reference threshold Nth, a possibility that the drive wheel is slipping is high. In addition, more specifically, the reference target rotation speed Ntg is set to the value at which the slipping state of the drive wheel on which the normal tire is mounted can be canceled as described above. Thus, as illustrated in FIG. 3, the reference target rotation speed Ntg is set to be a lower value than the reference threshold Nth. In addition, as illustrated in FIG. 3, the reference target rotation speed Ntg is set to be a higher value than the normal wheel basic rotation speed Nb. For instance, as illustrated in FIG. 3, the reference target rotation speed Ntg may be set as the higher value than the normal wheel basic rotation speed Nb by a constant magnitude at each vehicle speed. The reference target rotation speed Ntg may be set as a value that is acquired by multiplying the normal wheel basic rotation speed Nb by a certain slippage rate at each vehicle speed. As specifically illustrated in FIG. 3, the reference target rotation speed Ntg is set to be increased as the vehicle speed is increased.

(Different-Diameter Determination Unit)

The different-diameter determination unit 130 determines whether the different-diameter tire, which has the different diameter from the reference diameter, is mounted on the drive wheel. In addition, the different-diameter determination unit 130 outputs a determination result to the threshold adjuster 140 and the target value adjuster 150. More specifically, the different-diameter determination unit 130 determines whether the different-diameter tire is mounted on each of the drive wheels.

For instance, based on the detection result of the rotation speed of each of the drive wheels, the different-diameter determination unit 130 determines whether the different-diameter tire is mounted on each of the drive wheels. More specifically, in the case where a state where the rotation speed of one of the drive wheels is higher than the rotation speeds of the other drive wheels by a specified value or greater continues for a specified time period during straight travel of the vehicle 1, the different-diameter determination unit 130 determines that the different-diameter tire is mounted on the one drive wheel. For instance, in the case where a state where the rotation speed of the left front wheel 11a is higher than the right front wheel 11b, the left rear wheel 11c, and the right rear wheel 11d by the specified value or greater continues for the specified time period during the straight travel of the vehicle 1, the different-diameter determination unit 130 determines that the different-diameter tire is mounted on the left front wheel 11a.

Note that determination processing by the different-diameter determination unit 130 is not particularly limited to the above instance. For instance, in the case where the vehicle 1 includes a sensor that can directly detect the diameter of the tire mounted on each of the drive wheels, the different-diameter determination unit 130 may determine whether the different-diameter tire is mounted on each of the drive wheels on the basis of a detection result by the sensor.

(Threshold Adjuster)

Based on the determination result by the different-diameter determination unit 130, the threshold adjuster 140 adjusts the threshold, which used for the determination on the slippage by the slippage determination unit 110. More specifically, in the case where it is determined that the different-diameter tire is mounted on the drive wheel, the threshold adjuster 140 adjusts the threshold on the basis of a ratio between the diameter of the tire mounted on the drive wheel and the reference diameter. In addition, the threshold adjuster 140 outputs information indicative of the adjusted threshold to the slippage determination unit 110. More specifically, in the case where it is determined that the different-diameter tire is mounted on the drive wheel, the threshold adjuster 140 adjusts the threshold on the basis of a proportion of the reference diameter to the diameter of the tire mounted on the drive wheel.

For instance, in the case where it is determined that the different-diameter tire is mounted on the drive wheel, the threshold adjuster 140 first computes a different diameter ratio K that is a proportion of a reference diameter $r_0$ to a diameter $r_1$ of the tire mounted on the drive wheel. The different diameter ratio K is represented by the following formula (1).

$$K = \frac{r_0}{r_1} \qquad (1)$$

In the formula (1), $r_0$ is the reference diameter, which is the diameter of the normal tire, and $r_1$ is the diameter of the tire mounted on the drive wheel on which the different-diameter tire is determined to be mounted. For instance, $r_0$ corresponds to a radius of the normal tire, and $r_1$ corresponds to a radius of the tire mounted on the drive wheel on which the different-diameter tire is determined to be mounted. Here, $r_0$ may correspond to the diameter of the normal tire. In such a case, $r_1$ corresponds to the diameter of the tire mounted on the drive wheel on which the different-diameter tire is determined to be mounted.

A relationship among the reference diameter $r_0$, the diameter $r_1$ of the tire mounted on the drive wheel on which the different-diameter tire is determined to be mounted, a rotation speed $\omega 0$ of the drive wheel on which the normal tire is mounted, and a rotation speed $\omega 1$ of the drive wheel on which the different-diameter tire is determined to be mounted is represented by the following formula (2).

$$r_0 \omega_0 = r_1 \omega_1 \qquad (2)$$

Therefore, the following formula (3) is derived from the formula (1) and the formula (2).

$$K = \frac{\omega_1}{\omega_0} \quad (3)$$

The threshold adjuster 140 can compute the different diameter ratio K on the basis of the formula (3) by applying the rotation speed of the drive wheel on which the different-diameter tire is not determined to be mounted as the rotation speed ω0 of the drive wheel on which the normal tire is mounted, for instance. Then, based on the different diameter ratio K, the threshold adjuster 140 adjusts the threshold from the reference threshold Nth to a different-diameter wheel threshold Dth. The different-diameter wheel threshold Dth is the threshold that has been adjusted by the threshold adjuster 140.

Figure 4:
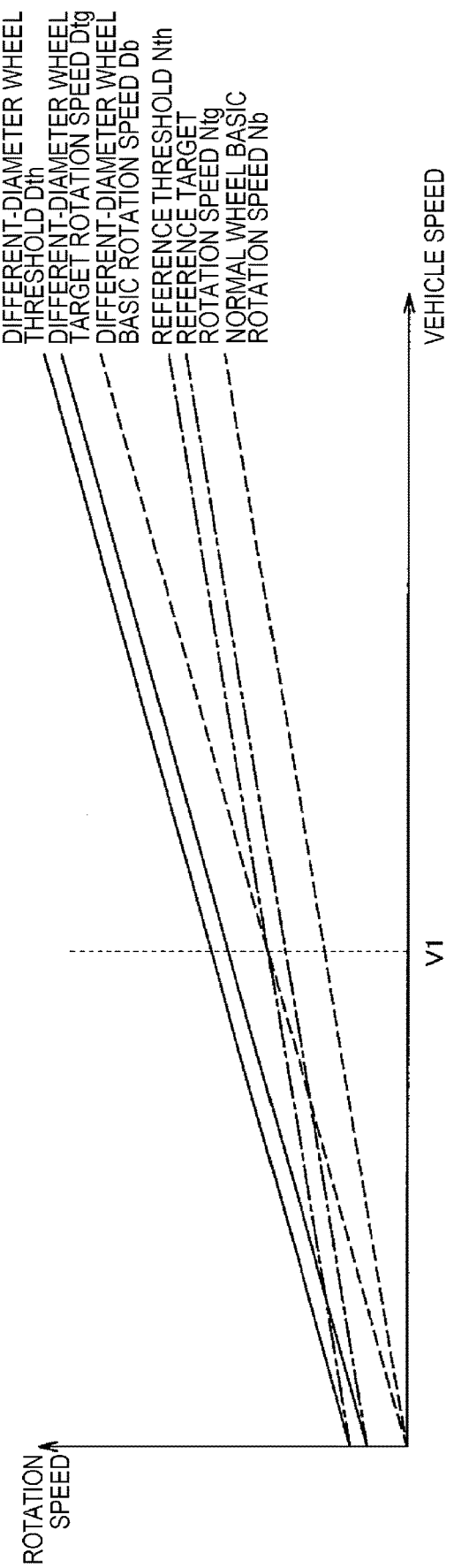
FIG. 4 is an explanatory graph illustrating an instance of a relationship between a different-diameter wheel threshold and the reference threshold and an instance of a relationship between a different-diameter wheel target rotation speed and the reference target rotation speed.
Figure 5:
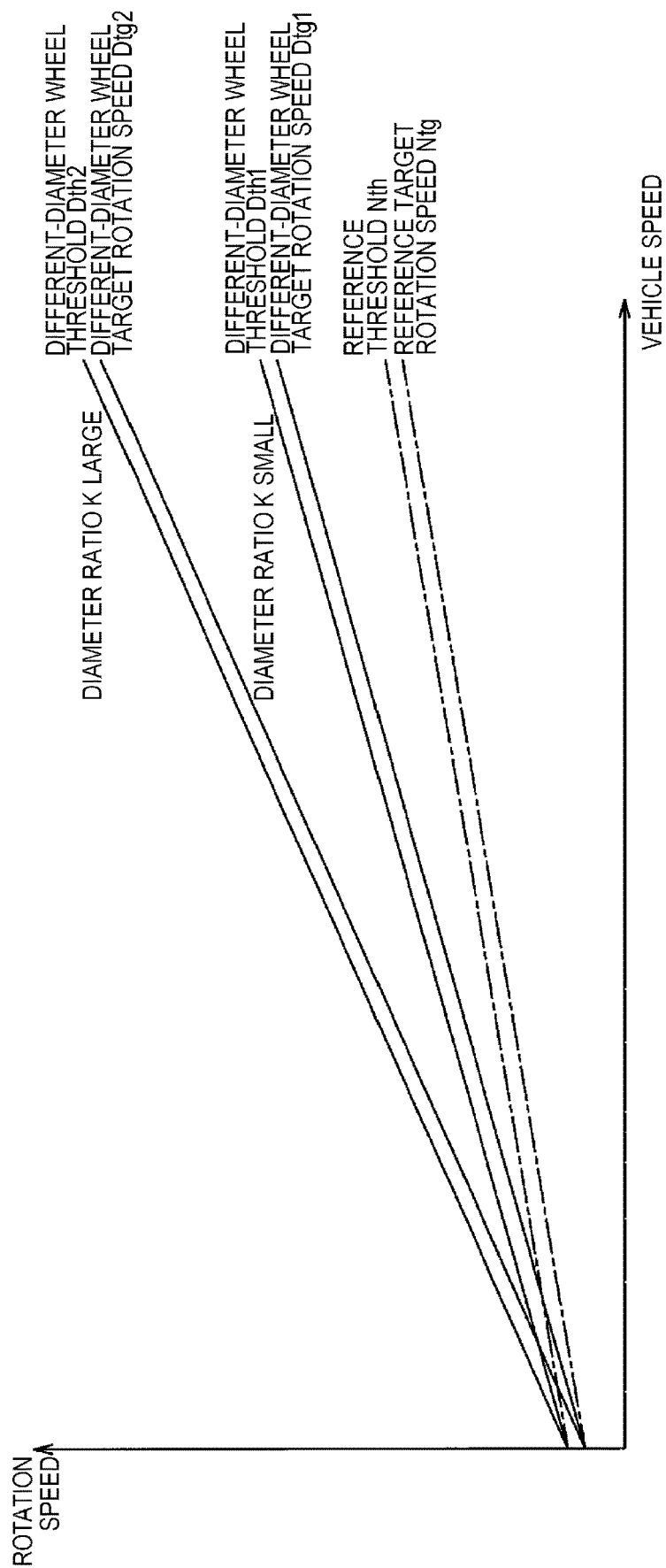
FIG. 5 is an explanatory graph illustrating an instance of a relationship between the different-diameter wheel threshold and a different diameter ratio and an instance of a relationship between the different-diameter wheel target rotation speed and the different diameter ratio.

The adjustment of the threshold by the threshold adjuster 140 will be described in more detail with reference to FIG. 4 and FIG. 5. FIG. 4 is an explanatory graph illustrating an instance of a relationship between the different-diameter wheel threshold Dth and the reference threshold Nth and an instance of a relationship between a different-diameter wheel target rotation speed Dtg and the reference target rotation speed Ntg. FIG. 5 is an explanatory graph illustrating an instance of a relationship between the different-diameter wheel threshold Dth and the different diameter ratio K and an instance of a relationship between the different-diameter wheel target rotation speed Dtg and the different diameter ratio K. The different-diameter wheel target rotation speed Dtg will be described below in the description of the target value adjuster 150.

As a situation where the different-diameter tire is mounted on the drive wheel, as described above, a situation where a spare tire is mounted on the drive wheel, a situation where the tire mounted on the drive wheel has been punctured, and the like are assumed. In any of these situations, the diameter of the different-diameter tire is smaller than the reference diameter $r_0$. Accordingly, the diameter $r_1$ of the tire mounted on the drive wheel on which the different-diameter tire is determined to be mounted is possibly smaller than the reference diameter $r_0$. Thus, as illustrated in FIG. 4, a different-diameter wheel basic rotation speed Db is possibly higher than the normal wheel basic rotation speed Nb at each vehicle speed. The different-diameter wheel basic rotation speed Db is a basic rotation speed in the case where the drive wheel on which the different-diameter tire is determined to be mounted is not slipping. As a result, the different-diameter wheel basic rotation speed Db possibly exceeds the reference threshold Nth. For instance, in the instance illustrated in FIG. 4, the different-diameter wheel basic rotation speed Db exceeds the reference threshold Nth when the vehicle speed is higher than a speed V1. Thus, in the case where the reference threshold Nth is tentatively set as the threshold in the situation where the different-diameter tire is mounted on the drive wheel, the slippage control is possibly executed despite a fact that the slippage does not actually occur.

More specifically, in the case where it is determined that the different-diameter tire is mounted on the drive wheel, the threshold adjuster 140 adjusts the threshold by an adjustment amount that corresponds to the different diameter ratio K. Further specifically, the threshold adjuster 140 first computes the different-diameter wheel basic rotation speed Db in accordance with the different diameter ratio K. For instance, the threshold adjuster 140 computes a value that is acquired by multiplying the normal wheel basic rotation speed Nb by the different diameter ratio K as the different-diameter wheel basic rotation speed Db. Next, based on the computed different-diameter wheel basic rotation speed Db, the threshold adjuster 140 computes the different-diameter wheel threshold Dth. For instance, the threshold adjuster 140 adds a difference between the normal wheel basic rotation speed Nb and the reference threshold Nth to the different-diameter wheel basic rotation speed Db. Then, the threshold adjuster 140 computes the acquired value as the different-diameter wheel threshold Dth. Thereafter, the threshold adjuster 140 adjusts the threshold from the reference threshold Nth to the different-diameter wheel threshold Dth that is computed as described above. The above different-diameter wheel threshold Dth can be computed in a similar manner at each vehicle speed.

As described above, in the case where it is determined that the different-diameter tire is mounted on the drive wheel, for instance, the threshold adjuster 140 adjusts the threshold on the basis of the different diameter ratio K. Here, a proportion of the different-diameter wheel basic rotation speed Db to the normal wheel basic rotation speed Nb is correlated with the different diameter ratio K. Thus, the threshold can appropriately be adjusted in accordance with the different-diameter wheel basic rotation speed Db. For instance, as illustrated in FIG. 4, in the case where the diameter $r_1$ of the tire mounted on the drive wheel on which the different-diameter tire is determined to be mounted is smaller than the reference diameter $r_0$, the threshold is increased from the reference threshold Nth. In this way, the different-diameter wheel threshold Dth as the adjusted threshold can be set higher than the different-diameter wheel basic rotation speed Db at each vehicle speed.

More specifically, in the case where it is determined that the different-diameter tire is mounted on the drive wheel, the threshold adjuster 140 adjusts the threshold by the adjustment amount that corresponds to the different diameter ratio K. In this way, the threshold can appropriately be adjusted in accordance with the different-diameter wheel basic rotation speed Db. For instance, in the case where the diameter $r_1$ of the tire mounted on the drive wheel, on which the different-diameter tire is determined to be mounted, is smaller than the reference diameter $r_0$, the threshold can be increased from the reference threshold Nth by an increase amount that is increased as the different diameter ratio K is increased. For instance, as illustrated in FIG. 5, as a different-diameter wheel threshold Dth2 in the case where the different diameter ratio K is relatively large, the threshold adjuster 140 computes a higher value than a different-diameter wheel threshold Dth1 in the case where the different diameter ratio K is relatively small at each vehicle speed. In this way, in the case where the different diameter ratio K is relatively large, the threshold can be increased from the reference threshold Nth by the larger increase amount than that in the case where the different diameter ratio K is relatively small.

In the case where the diameter $r_1$ of the tire mounted on the drive wheel, on which the different-diameter tire is mounted, is larger than the reference diameter $r_0$, the threshold adjuster 140 may lower the threshold from the reference threshold Nth. In this way, in a situation where the different-diameter tire that has the larger diameter than the reference diameter $r_0$ is mounted on the drive wheel, the slippage control can be executed at an appropriate frequency that corresponds to an actual slippage occurrence state.

(Target Value Adjuster)

Based on the detection result by the different-diameter determination unit 130, the target value adjuster 150 adjusts the target value used for the driving force control by the control unit 120. More specifically, in the case where it is determined that the different-diameter tire is mounted on the drive wheel, the target value adjuster 150 adjusts the target value on the basis of the ratio between the diameter of the tire mounted on the drive wheel and the reference diameter. In addition, the target value adjuster 150 outputs information indicative of the adjusted target value to the control unit 120. More specifically, in the case where it is determined that the different-diameter tire is mounted on the drive wheel, the target value adjuster 150 adjusts the target value on the basis of the proportion of the reference diameter to the diameter of the tire mounted on the drive wheel.

For instance, in the case where it is determined that the different-diameter tire is mounted on the drive wheel, the target value adjuster 150 first computes the different diameter ratio K that is the proportion of the reference diameter $r_0$ to the diameter $r_1$ of the tire mounted on the drive wheel. Similar to the threshold adjuster 140, the target value adjuster 150 can compute the different diameter ratio K on the basis of the formula (3). Then, based on the different diameter ratio K, the target value adjuster 150 adjusts the target rotation speed as the target value from the reference target rotation speed Ntg to the different-diameter wheel target rotation speed Dtg. The different-diameter wheel target rotation speed Dtg is the target rotation speed that is adjusted by the target value adjuster 150. In the control device 100, any of the functional units may have a function of computing the different diameter ratio K. For instance, both of the threshold adjuster 140 and the target value adjuster 150 may have the function of computing the different diameter ratio K. Alternatively, the target value adjuster 150 may acquire the different diameter ratio K that is computed by the threshold adjuster 140.

Here, with reference to FIG. 4 and FIG. 5, the adjustment of the target value by the target value adjuster 150 will be described in more detail.

As illustrated in FIG. 4, as described above, the different-diameter wheel basic rotation speed Db that is the basic rotation speed in the case where the drive wheel on which the different-diameter tire is determined to be mounted is not slipping can be higher than the normal wheel basic rotation speed Nb at each vehicle speed. Accordingly, the reference target rotation speed Ntg possibly becomes excessively lower than the different-diameter wheel basic rotation speed Db. For instance, In the instance illustrated in FIG. 4, the reference target rotation speed Ntg falls below the different-diameter wheel basic rotation speed Db when the vehicle speed is higher than the speed V1. Thus, in the case where the reference target rotation speed Ntg is tentatively set as the target rotation speed in the situation where the different-diameter tire is mounted on the drive wheel, the torque down is possibly executed with an excessive lowering amount at a time when the slippage control is executed due to the slippage of the drive wheel. More specifically, at this time, the drive torque of the drive wheel is possibly lowered by the lowering amount that is excessively greater than the lowering amount of the drive torque that is required to cancel the slipping state of the drive wheel.

More specifically, in the case where it is determined that the different-diameter tire is mounted on the drive wheel, the target value adjuster 150 adjusts the target value by an adjustment amount that corresponds to the different diameter ratio K. Further specifically, the target value adjuster 150 first computes the different-diameter wheel basic rotation speed Db in accordance with the different diameter ratio K. For instance, the target value adjuster 150 computes the value that is acquired by multiplying the normal wheel basic rotation speed Nb by the different diameter ratio K as the different-diameter wheel basic rotation speed Db. Next, based on the computed different-diameter wheel basic rotation speed Db, the target value adjuster 150 computes the different-diameter wheel target rotation speed Dtg. For instance, the target value adjuster 150 computes a value that is acquired by adding a difference between the normal wheel basic rotation speed Nb and the reference target rotation speed Nt to the different-diameter wheel basic rotation speed Db as the different-diameter wheel target rotation speed Dtg. Then, the target value adjuster 150 adjusts the target rotation speed from the reference target rotation speed Ntg to the different-diameter wheel target rotation speed Dtg that is computed as described above. The above different-diameter wheel target rotation speed Dtg can be computed in a similar manner at each vehicle speed.

As described above, in the case where it is determined that the different-diameter tire is mounted on the drive wheel, for instance, the target value adjuster 150 adjusts the target value on the basis of the different diameter ratio K. Here, a proportion of the different-diameter wheel basic rotation speed Db to the normal wheel basic rotation speed Nb is correlated with the different diameter ratio K. Thus, the target value can appropriately be adjusted in accordance with the different-diameter wheel basic rotation speed Db. For instance, as illustrated in FIG. 4, in the case where the diameter $r_1$ of the tire mounted on the drive wheel, on which the different-diameter tire is determined to be mounted, is smaller than the reference diameter $r_0$, the target rotation speed is increased from the reference target rotation speed Ntg. In this way, the different-diameter wheel target rotation speed Dtg as the adjusted target rotation speed can be set higher than the different-diameter wheel basic rotation speed Db and lower than the different-diameter wheel threshold Dth at each vehicle speed.

More specifically, in the case where it is determined that the different-diameter tire is mounted on the drive wheel, the target value adjuster 150 adjusts the target value by the adjustment amount that corresponds to the different diameter ratio K. In this way, the target value can appropriately be adjusted in accordance with the different-diameter wheel basic rotation speed Db. For instance, in the case where the diameter $r_1$ of the tire mounted on the drive wheel, on which the different-diameter tire is determined to be mounted, is smaller than the reference diameter $r_0$, the target rotation speed can be increased from the reference target rotation speed Ntg by an increase amount that is increased as the different diameter ratio K is increased. For instance, as illustrated in FIG. 5, as a different-diameter wheel target rotation speed Dtg2 in the case where the different diameter ratio K is relatively large, the target value adjuster 150 computes a higher value than a different-diameter wheel target rotation speed Dtg1 in the case where the different diameter ratio K is relatively small at each vehicle speed. In this way, in the case where the different diameter ratio K is relatively large, the target rotation speed can be increased from the reference target rotation speed Ntg by the larger increase amount than that in the case where the different diameter ratio K is relatively small.

In the case where the diameter $r_1$ of the tire mounted on the drive wheel, on which the different-diameter tire is mounted, is larger than the reference diameter $r_0$, the target value adjuster 150 may lower the target rotation speed from the reference target rotation speed Ntg. In this way, in the situation where the different-diameter tire that has the larger diameter than the reference diameter $r_0$ is mounted on the drive wheel, the torque down can be executed with the further appropriate lowering amount.

As it has been described so far, in the example, in the case where it is determined that the different-diameter tire is mounted on the drive wheel, the threshold adjuster 140 adjusts the threshold, which is used for the determination on whether the drive wheel is slipping, on the basis of the ratio between the diameter $r_1$ of the tire mounted on the drive wheel and the reference diameter $r_0$. Here, the ratio between the normal wheel basic rotation speed Nb and the different-diameter wheel basic rotation speed Db depends on the ratio between the diameter $r_1$ of the tire mounted on the drive wheel, on which the different-diameter tire is determined to be mounted, and the reference diameter $r_0$. Thus, according to the example, the threshold can appropriately be adjusted in accordance with the different-diameter wheel basic rotation speed Db. In this way, in the situation where the different-diameter tire is mounted on the drive wheel, the appropriate driving force control that corresponds to the actual slippage occurrence state can be executed. More specifically, because the execution of the slippage control can be prevented at the time when the slippage does not actually occur, the execution of the torque down at the excessive frequency can be prevented. Thus, in the situation where the different-diameter tire is mounted on the drive wheel, the vehicle behavior can be prevented from becoming unstable.

In the example, in the case where it is determined that the different-diameter tire is mounted on the drive wheel, the target value adjuster 150 adjusts the target value, which is used for the driving force control, on the basis of the ratio between the diameter of the tire mounted on the drive wheel and the reference diameter. In addition, as described above, the ratio between the normal wheel basic rotation speed Nb and the different-diameter wheel basic rotation speed Db depends on the ratio between the diameter $r_1$ of the tire mounted on the drive wheel, on which the different-diameter tire is determined to be mounted, and the reference diameter $r_0$. Thus, the target value can appropriately be adjusted in accordance with the different-diameter wheel basic rotation speed Db. In this way, in the slippage control, the lowering amount of the driving force by the torque down can be optimized. More specifically, in the situation where the different-diameter tire is mounted on the drive wheel, the execution of the torque down with the excessive lowering amount can be prevented. Thus, in the situation where the different-diameter tire is mounted on the drive wheel, the vehicle behavior can further effectively be prevented from becoming unstable.

[2-2. Operation]

Next, a procedure executed by the control device 100 according to the example will be described with reference to FIG. 6 to FIG. 8.

First, a control flow by the control device 100 according to the example will be described with reference to a flowchart illustrated FIG. 6. FIG. 6 is the flowchart illustrating an instance of a procedure executed by the control device 100 according to the example.

Figure 6:
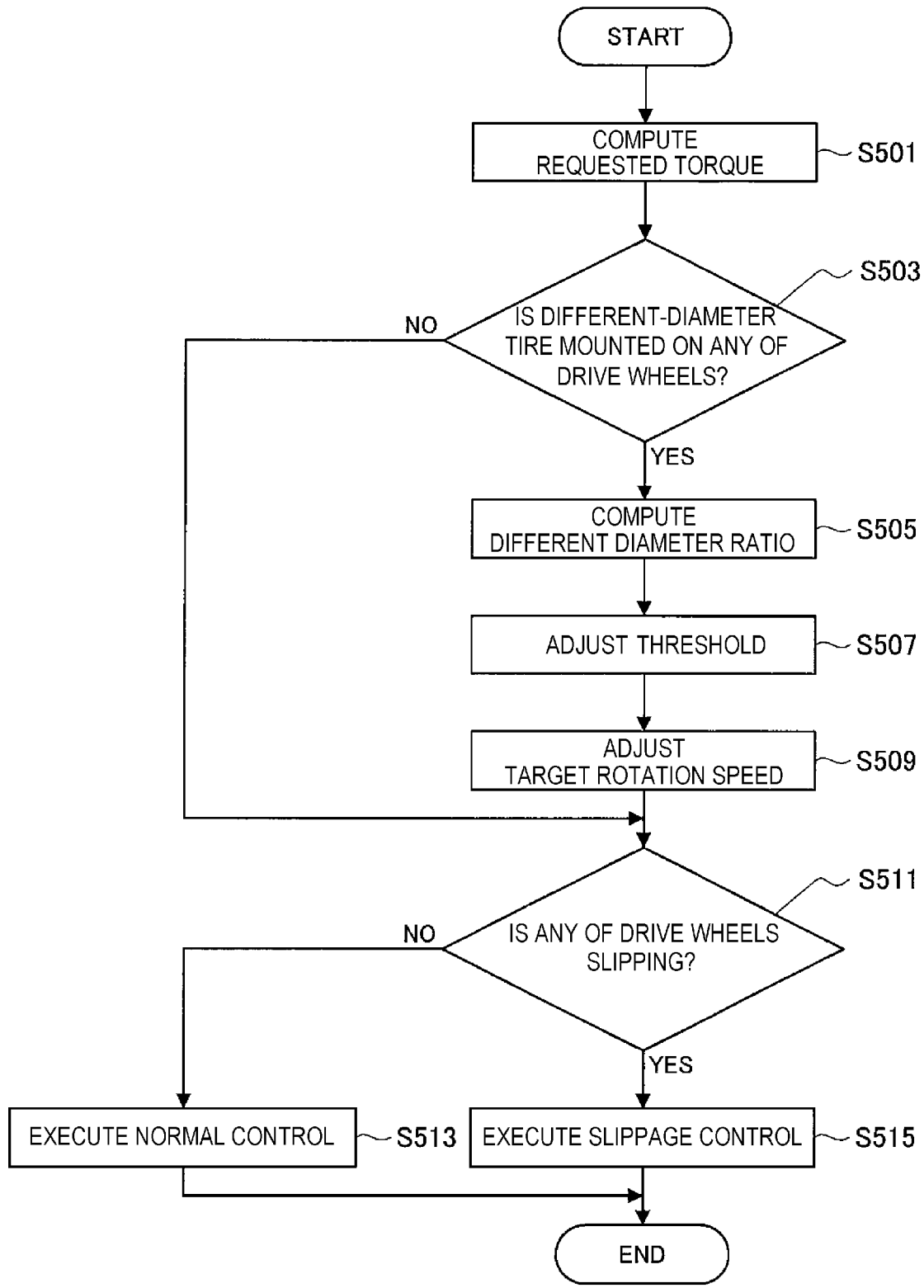
FIG. 6 is a flowchart illustrating an instance of a procedure executed by the control device according to the example.

As illustrated in FIG. 6, the control unit 120 first computes the requested torque (step S501). Next, the different-diameter determination unit 130 determines whether the different-diameter tire is mounted on each of the drive wheels (step S503). If it is determined that the different-diameter tire is mounted on none of the drive wheels (step S503/NO), the processing proceeds to step S511. On the other hand, if it is determined that the different-diameter tire is mounted on any of the drive wheels (step S503/YES), the threshold adjuster 140 and the target value adjuster 150 each compute the different diameter ratio K of the drive wheel, on which the different-diameter tire is determined to be mounted (step S505). Then, based on the different diameter ratio K, the threshold adjuster 140 adjusts the threshold for the drive wheel (step S507). Thereafter, based on the different diameter ratio K, the target value adjuster 150 adjusts the target rotation speed for the drive wheel (step S509).

Next, the slippage determination unit 110 determines whether each of the drive wheels is slipping (step S511). If it is determined that none of the drive wheels is slipping (step S511/NO), the control unit 120 executes the normal control (step S513), and the processing illustrated in FIG. 6 is terminated. On the other hand, if it is determined that any of the drive wheels is slipping (step S511/YES), the control unit 120 executes the slippage control for the drive wheel that is determined to be slipping (step S515). Then, the processing illustrated in FIG. 6 is terminated.

Next, a description will be made on transitions in the rotation speed and the drive torque of the drive wheel on which the different-diameter tire is mounted, in the case where each of the control according to a reference example and the control according to the example is executed with reference to FIG. 7 and FIG. 8.

Figure 7:
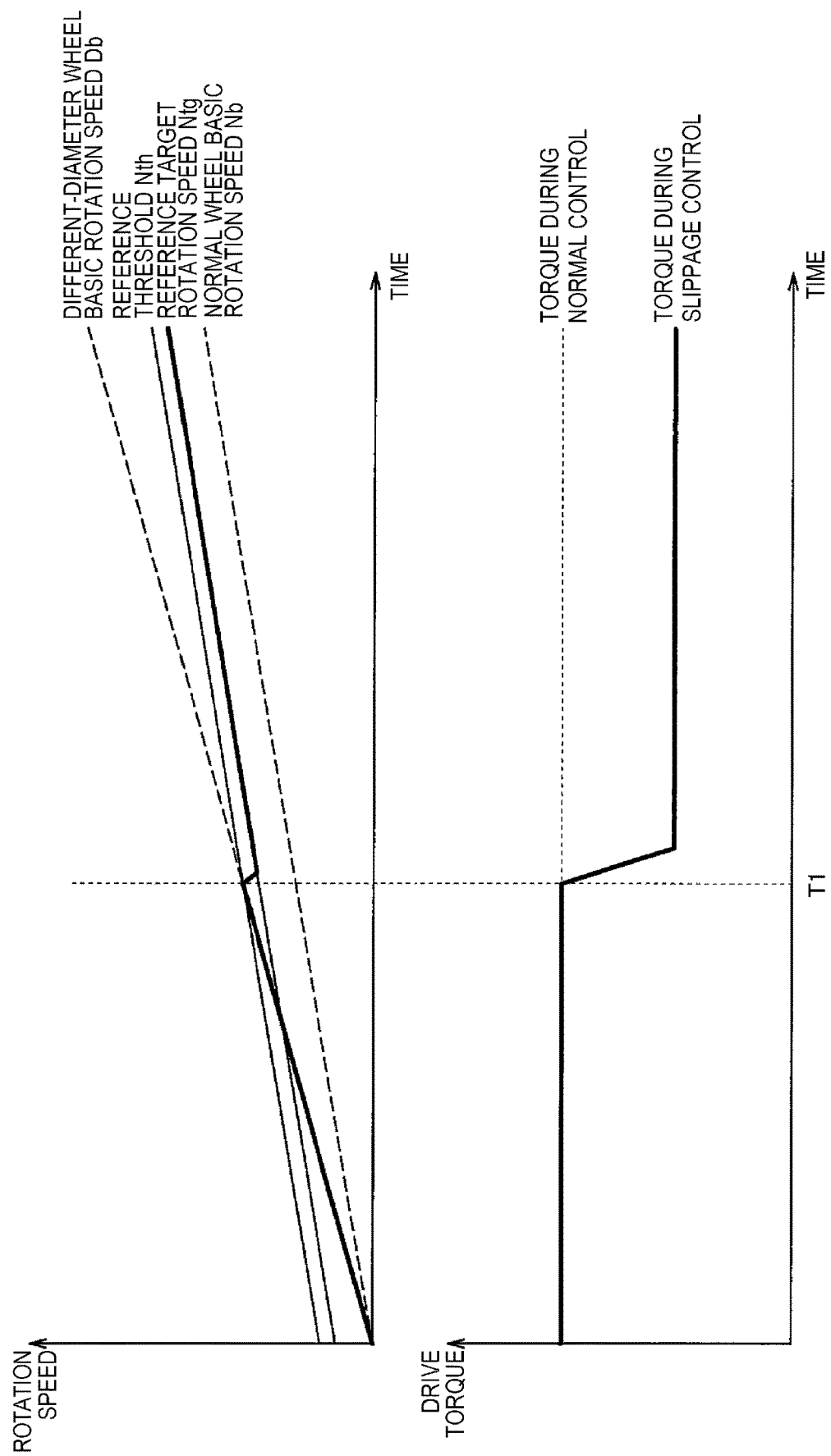
FIG. 7 is a graph illustrating an instance of transitions in a rotation speed and drive torque of a drive wheel on which a different-diameter tire is mounted in the case where control according to a reference example is executed.

FIG. 7 is a graph illustrating an instance of the transitions in the rotation speed and the drive torque of a drive wheel on which the different-diameter tire is mounted in the case where the control according to the reference example is executed. More specifically, FIG. 7 schematically illustrates the instance of the transitions in the rotation speed and the drive torque of the drive wheel in the case where the vehicle 1 keeps accelerating and the drive wheel is not slipping. The normal tire is mounted on each of the drive wheels other than the above drive wheel.

Differing from the control according to the example, in the control according to the reference example, the threshold that is used for the determination on the slippage is not adjusted on the basis of the determination result about the different-diameter tire. More specifically, in the control according to the reference example, the threshold is set to the reference threshold Nth regardless of whether the different-diameter tire is mounted on the drive wheel. Thus, regardless of whether the different-diameter tire is mounted on the drive wheel, it is determined that the drive wheel is slipping in the case where the rotation speed of the drive wheel exceeds the reference threshold Nth. In addition, in the control according to the reference example, regardless of whether the different-diameter tire is mounted on the drive wheel, the target rotation speed is set to the reference target rotation speed Ntg. Thus, regardless of whether the different-diameter tire is mounted on the drive wheel, in the case where it is determined that the drive wheel is slipping, the driving force of the drive wheel is controlled such that the rotation speed of the drive wheel matches the reference target rotation speed Ntg.

In the instance illustrated in FIG. 7, prior to time T1, the rotation speed of the drive wheel on which the different-diameter tire is mounted substantially matches the different-diameter wheel basic rotation speed Db and falls below the reference threshold Nth. Accordingly, prior to the time T1, the normal control, which is the driving force control based on the requested torque, is executed. Thus, as illustrated in FIG. 7, prior to the time T1, the drive torque of the drive wheel corresponds to the torque during the normal control. Then, at the time T1 at which the rotation speed of the drive wheel exceeds the reference threshold Nth, the driving force control is switched from the normal control to the slippage control, and the torque down is executed. As a result, as illustrated in FIG. 7, after the time T1, the drive torque of the drive wheel becomes lower than the torque during the normal control, and the drive torque of the drive wheel is controlled such that the rotation speed of the drive wheel matches the reference target rotation speed Ntg.

As described above, according to the reference example in which the threshold used for the determination on the slippage is not adjusted on the basis of the determination result about the different-diameter tire, the slippage control is possibly executed even when the slippage does not actually occur. For this reason, the torque down is possibly executed at the excessive frequency. Thus, the vehicle behavior possibly becomes unstable.

Figure 8:
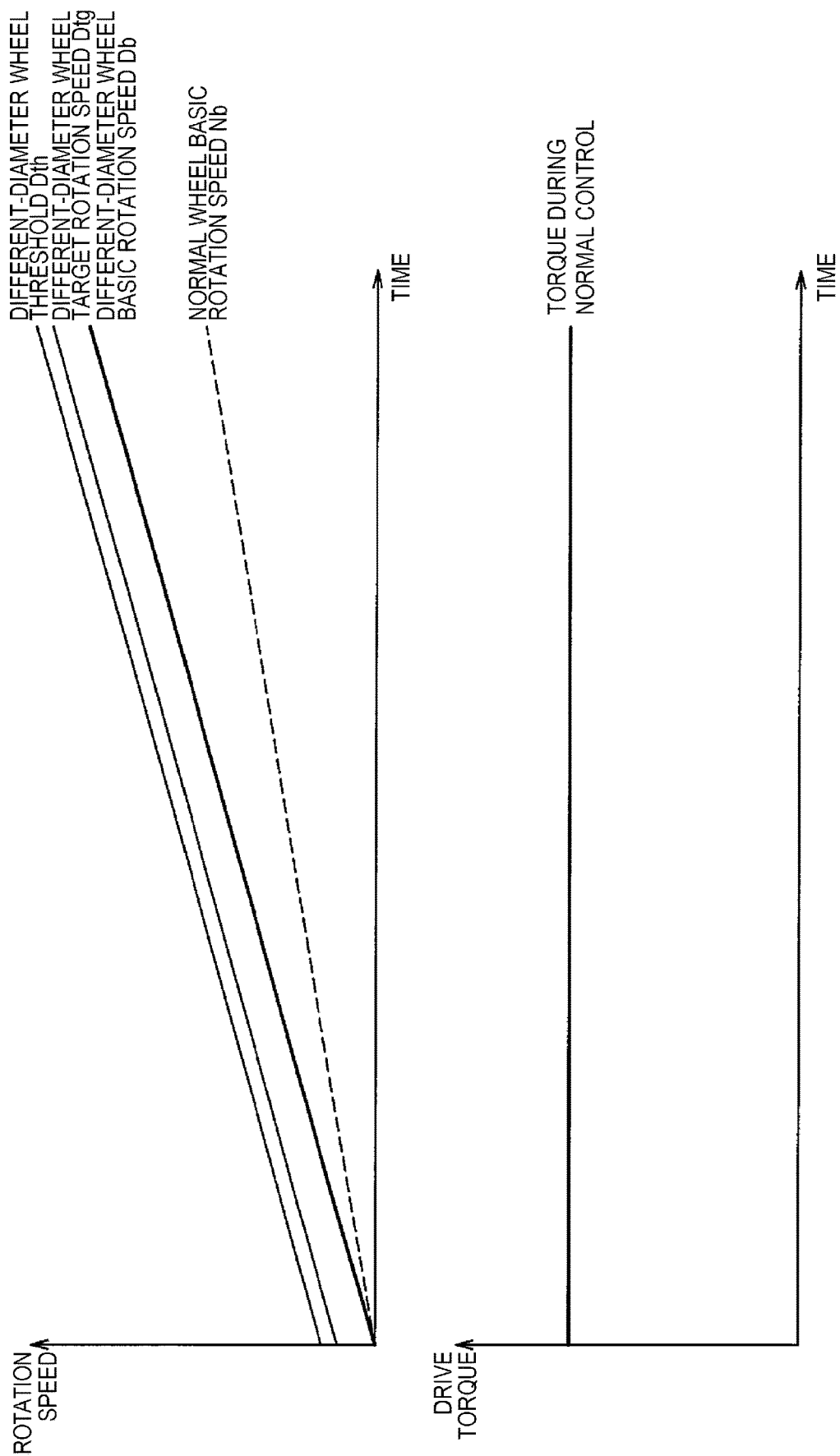
FIG. 8 is a graph illustrating an instance of the transitions in the rotation speed and the drive torque of the drive wheel on which the different-diameter tire is mounted in the case where control according to the example is executed.

FIG. 8 is a graph illustrating an instance of the transitions in the rotation speed and the drive torque of the drive wheel on which the different-diameter tire is mounted in the case where the control according to the example is executed. More specifically, FIG. 8 schematically illustrates the instance of the transitions in the rotation speed and the drive torque of the drive wheel in the case where the vehicle 1 keeps accelerating and the drive wheel is not slipping. The normal tire is mounted on each of the drive wheels other than the above drive wheel.

In the control according to the example, as described above, the threshold that is used for the determination on the slippage is adjusted on the basis of the determination result about the different-diameter tire. Thus, based on the different diameter ratio K, the threshold is adjusted from the reference threshold Nth to the different-diameter wheel threshold Dth by the threshold adjuster 140. In addition, based on the different diameter ratio K, the target rotation speed is adjusted from the reference target rotation speed Ntg to the different-diameter wheel target rotation speed Dtg by the target value adjuster 150.

In the instance illustrated in FIG. 8, regardless of time, the rotation speed of the drive wheel on which the different-diameter tire is mounted substantially matches the different-diameter wheel basic rotation speed Db and falls below the different-diameter wheel threshold Dth. Accordingly, regardless of the time, the normal control, which is the driving force control based on the requested torque, is executed. Thus, as illustrated in FIG. 8, regardless of the time, the drive torque of the drive wheel corresponds to the torque during the normal control.

As described above, according to the example, the execution of the slippage control can be prevented at the time when the slippage does not actually occur. For this reason, the execution of the torque down at the excessive frequency can be prevented. Thus, in the situation where the different-diameter tire is mounted on the drive wheel, the vehicle behavior can be prevented from becoming unstable. In addition, the target value can appropriately be adjusted in accordance with the different-diameter wheel basic rotation speed Db. In this way, in the situation where the different-diameter tire is mounted on the drive wheel, the execution of the torque down with the excessive lowering amount can be prevented. Thus, in the situation where the different-diameter tire is mounted on the drive wheel, the vehicle behavior can further effectively be prevented from becoming unstable.

3. Conclusion

As it has been described so far, according to the example, in the case where it is determined that the different-diameter tire is mounted on the drive wheel, the threshold that is used for the determination on whether the drive wheel is slipping is adjusted on the basis of the ratio between the diameter $r_1$ of the tire mounted on the drive wheel and the reference diameter $r_0$. In this way, the threshold can appropriately be adjusted in accordance with the different-diameter wheel basic rotation speed Db. The different-diameter wheel basic rotation speed Db is the basic rotation speed in the case where the drive wheel on which the different-diameter tire is determined to be mounted is not slipping. Thus, in the situation where the different-diameter tire is mounted on the drive wheel, the appropriate driving force control that corresponds to the actual slippage occurrence state can be executed. More specifically, because the execution of the slippage control can be prevented at the time when the slippage does not actually occur, the execution of the torque down at the excessive frequency can be prevented. Thus, in the situation where the different-diameter tire is mounted on the drive wheel, the vehicle behavior can be prevented from becoming unstable.

The above description has primarily been made on the instance in which the rotation speed of the drive wheel is applied as the index value. However, the rotation speed of the motor that drives the drive wheel may be applied as the index value. In this case, for instance, in the case where the rotation speed of the drive motor 15f, which drives the front wheels, exceeds the threshold, the slippage determination unit 110 determines that at least one of the left front wheel 11a and the right front wheel 11b as the front wheels is slipping. More specifically, the threshold is set for each of the drive motors. For instance, in the case where it is determined that the different-diameter tire is mounted on at least one of the front wheels, the threshold adjuster 140 adjusts the threshold regarding the drive motor 15f. Meanwhile, in the case where it is determined that the different-diameter tire is mounted on none of the rear wheels, the threshold adjuster 140 does not adjust the threshold regarding the drive motor 15r that drives the rear wheels.

In the cases where the rotation speed of the motor that drives the drive wheel is applied as the index value and where it is determined that at least one of the left front wheel 11a and the right front wheel 11b as the front wheels is slipping, for instance, the control unit 120 controls the driving force of at least one of the front wheels such that the rotation speed of the drive motor 15f matches the target rotation speed. More specifically, the control unit 120 executes the torque down of each of the front wheels by lowering the output of the drive motor 15f. In this way, the control unit 120 controls the driving force of each of the front wheels such that the rotation of the drive motor 15f matches the target rotation speed. In addition, more specifically, the target rotation speed as the target value is set for each of the drive motors. For instance, in the case where it is determined that the different-diameter tire is mounted on at least one of the front wheels, the target value adjuster 150 adjusts the target rotation speed of the drive motor 15f. Meanwhile, if it is determined that the different-diameter tire is mounted on none of the rear wheels, the target value adjuster 150 does not adjust the target rotation speed of the drive motor 15r.

As described above, by applying the rotation speed of the motor that drives the drive wheel as the index value, the motor can be controlled directly. Thus, a duration from the detection of the index value to the output of the operation instruction to the motor can be shortened. In this way, responsiveness can be improved. In addition, in the cases where the rotation speed of the motor that drives the drive wheel is applied as the index value and where the different-diameter tire is mounted on the drive wheel, the threshold adjuster 140 adjusts the threshold on the basis of the ratio between the diameter $r_1$ of the tire mounted on the drive wheel and the reference diameter $r_0$. Furthermore, in the case where it is determined that the different-diameter tire is mounted on the drive wheel, the target value adjuster 150 adjusts the target value on the basis of the ratio between the diameter $r_1$ of the tire mounted on the drive wheel and the reference diameter $r_0$. Thus, even in the case where the rotation speed of the motor that drives the drive wheel is applied as the index value, the same effect as that obtained in the case where the rotation speed of the drive wheel is applied as the index value can be exerted.

The above description has primarily been made on the instance in which the reference target rotation speed Ntg is set to the value capable of canceling the slipping state of the drive wheel on which the normal tire is mounted. However, the reference target rotation speed Ntg may be set to another value. For instance, the reference target rotation speed Ntg may be set to the lowest rotation speed of the rotation speeds of the drive wheels. In this case, the reference target rotation speed Ntg is not set in advance and can vary in accordance with the detection result of the rotation speed of each of the drive wheels. Also, in this case, in the case where the normal tire is mounted on the drive wheel, the rotation speed of the slipping drive wheel is lowered. In this way, by reducing the difference between the rotation speeds of the front wheels and the rotation speeds of the rear wheels, the reference target rotation speed Ntg corresponds to the value capable of stabilizing the vehicle behavior.

The above description has been made on the instance in which the present invention is applied to the vehicle 1 that includes: the drive motor 15f as the drive source that drives the left front wheel 11a and the right front wheel 11b; and the drive motor 15r as the drive source that drives the left rear wheel 11c and the right rear wheel 11d. However, the technical scope of the present invention is not limited to the above instance. The present invention may be applied to a vehicle having another configuration as long as the vehicle can separately control the driving forces of the front wheels and the driving forces of the rear wheels. For instance, in the vehicle to which the present invention is applied, the drive motor may be provided for each of the drive wheels. In this case, in the slippage control, the torque down is possibly executed separately for each of the drive wheels.

The processing that has been described by using the flowchart in the present specification does not always have to be executed in the order illustrated in the flowchart. Some of the processing steps may be executed in parallel. For instance, in regard to the flowchart illustrated in FIG. 6, the processing of steps S507, S509 may not be executed in the order indicated by the flowchart but may be executed in parallel. In addition, an additional processing step may be adopted, or some of the processing steps may not be provided.

Although the preferred example of the present invention has been described in detail with reference to the accompanying drawings, the present invention is not limited to the example. Provided a person has ordinary knowledge in the technical field to which the example of the present invention pertains, within the scope of the technical idea described in the claims, the example of the present invention is intended to cover various modifications and applications, and such modifications are intended to fall within the technical scope of the present invention.

The invention claimed is:

1. A vehicle control device capable of separately controlling a driving force of a front wheel and a driving force of a rear wheel in a vehicle, the vehicle control device comprising:
a processor coupled to a memory storing instructions, the processor being configured to:
determine that a drive wheel is slipping in a case where an index value that is correlated with a rotation speed of the drive wheel exceeds a threshold corresponding to a vehicle speed;
control a driving force of the drive wheel such that the index value matches a target value that is set to cancel a slipping state of the drive wheel and corresponding to the vehicle speed in a case where it is determined that the drive wheel is slipping;
determine whether a different-diameter tire that has a different diameter from a reference diameter is mounted on the drive wheel;
adjust a threshold on a basis of a ratio between a diameter of the tire mounted on the drive wheel and the reference diameter in the case where it is determined that the different-diameter tire is mounted on the drive wheel; and
adjust the target value on the basis of the ratio in a case where it is determined that the different-diameter tire is mounted on the drive wheel.

2. The vehicle control device according to claim 1, wherein, in the case where it is determined that the different-diameter tire is mounted on the drive wheel, the processor adjusts the threshold on a basis of a proportion of the reference diameter to the diameter of the tire mounted on the drive wheel.

3. The vehicle control device according to claim 2, wherein, in the case where it is determined that the different-diameter tire is mounted on the drive wheel, the processor adjusts the threshold by an adjustment amount that corresponds to the proportion of the reference diameter to the diameter of the tire mounted on the drive wheel.

4. The vehicle control device according to claim 1, wherein, in the case where it is determined that the different-diameter tire is mounted on the drive wheel, the processor adjusts the target value on a basis of a proportion of the reference diameter to the diameter of the tire mounted on the drive wheel.

5. The vehicle control device according to claim 2, wherein, in the case where it is determined that the different-diameter tire is mounted on the drive wheel, the processor adjusts the target value on the basis of the proportion of the reference diameter to the diameter of the tire mounted on the drive wheel.

6. The vehicle control device according to claim 3, wherein, in the case where it is determined that the different-diameter tire is mounted on the drive wheel, the processor adjusts the target value on the basis of the proportion of the reference diameter to the diameter of the tire mounted on the drive wheel.

7. The vehicle control device according to claim 4, wherein, in the case where it is determined that the different-diameter tire is mounted on the drive wheel, the processor adjusts the target value by an adjustment amount that corresponds to the proportion of the reference diameter to the diameter of the tire mounted on the drive wheel.

8. The vehicle control device according to claim 5, wherein, in the case where it is determined that the different-diameter tire is mounted on the drive wheel, the processor adjusts the target value by an adjustment amount that corresponds to the proportion of the reference diameter to the diameter of the tire mounted on the drive wheel.

9. The vehicle control device according to claim 6, wherein, in the case where it is determined that the different-diameter tire is mounted on the drive wheel, the processor adjusts the target value by an adjustment amount that corresponds to the proportion of the reference diameter to the diameter of the tire mounted on the drive wheel.

10. The vehicle control device according to claim 1, wherein the index value includes the rotation speed of the drive wheel.

11. The vehicle control device according to claim 2, wherein the index value includes the rotation speed of the drive wheel.

12. The vehicle control device according to claim 3, wherein the index value includes the rotation speed of the drive wheel.

13. The vehicle control device according to claim 1, wherein the index value includes a rotation speed of a motor that drives the drive wheel.

14. The vehicle control device according to claim 2, wherein the index value includes a rotation speed of a motor that drives the drive wheel.

15. The vehicle control device according to claim 3, wherein the index value includes a rotation speed of a motor that drives the drive wheel.

\* \* \* \* \*